May 16, 1944. W. V. BROWN 2,349,137
SAFETY VALVE FOR TANKS
Filed Feb. 12, 1942
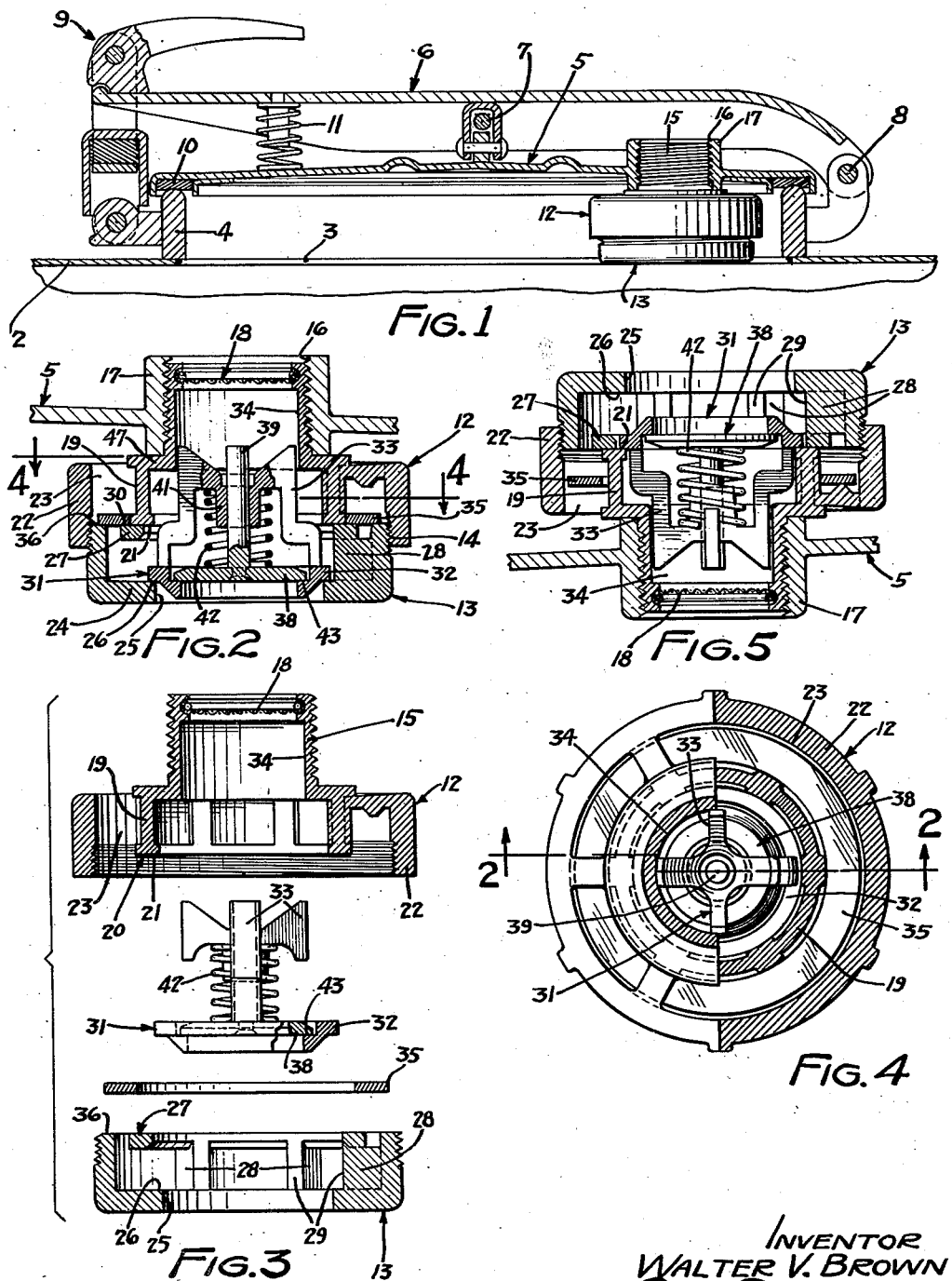
INVENTOR
WALTER V. BROWN
By Paul, Paul & Moore
ATTORNEYS Patented May 16, 1944

2,349,137

UNITED STATES PATENT OFFICE 2,349,137

SAFETY VALVE FOR TANKS

Walter V. Brown, Minneapolis, Minn., assignor to Brown Steel Tank Company, Minneapolis, Minn., a corporation of Minnesota Application February 12, 1942, Serial No. 430,626

2 Claims. (Cl. 277—61)

This invention relates to new and useful improvements in safety valves, and more particularly to such valves adapted for use on truck tanks utilized for transporting fuel oils, gasoline, and other liquids.

Truck tanks used for transporting fuel oil, gasoline, and various other liquids, are usually provided with a normally closed safety valve, which serves to vent the tank when it is being filled or when draining portions of the liquid therefrom, and it also serves to release abnormal or excessive pressure from within the tank. Abnormal pressure within such a tank may result from expansion of the liquid within the tank, caused by the hot rays of the sun beating down upon the filled tank, or from fire. When the filled tank is thus subjected to heat, the liquid therein may, at times, expand sufficiently to develop excessive pressure within the tank, which must be released to the atmosphere, otherwise the tank may explode with serious results.

There are numerous contingencies which may arise in the operation of a tank truck, particularly when utilized for transporting such liquids as gasoline. These contingencies must be controlled to render the truck transportation of such liquids safe and practical, and to avoid damage to the truck and its contents, and possible injury to the operator.

The various contingencies which may arise in the operation of a truck are: (a) the development of excessive pressure within the tank as a result of expansion of the liquid therein, which must be released to avoid possible damage to the apparatus, and perhaps serious injury to the operator; (b) the possible leakage or discharge of a portion of the contents of the tank through the usual "safety" breather or vent valve thereof, as a result of violent surging of the liquid within the tank; (c) in the danger of large quantities of the liquid spilling or discharging from the tank through the vent valve thereof, should the truck accidentally be overturned, which accidental discharging of liquid should be checked so far as possible, as a matter of economy, but should the contents of the overturned tank develop too great an internal pressure in the tank, quick release of a portion of the liquid in the tank should be affected to prevent bursting of the tank.

There are now numerous safety valves for oil tanks in commercial use, but these have not proven entirely satisfactory. The novel safety valve herein disclosed has been designed in an attempt to embody in a single compact unit, all of the necessary safety features required in a device of this general type, whereby a tank truck equipped with such a device may be operated with absolute safety under all normal operating conditions, even though the filled tank may be subjected to the hot rays of the sun for long periods.

An important feature of the present invention, therefore, is to provide a safety valve made in the form of a small compact independent unit, having a plurality of valves therein which are so arranged and constructed as to adequately vent the tank when necessary, and to prevent leakage of the liquid from the tank as the result of surging of the liquid therein, and also whereby the liquid cannot freely drain from the tank through the safety valve, should the tank be overturned.

A further object is to provide a safety valve comprising a body having a tubular extension adapted to be received in a threaded socket provided in the usual closure of the tank, and said body having breather exhaust and intake valves therein, and an emergency shut-off valve for preventing fluid flow from the tank through the safety valve, should the tank be overturned, and said body also having an emergency pressure release valve therein adapted to be opened only by excessive internal pressure in the tank, whereby the danger of the tank bursting or exploding as a result of internal pressure is positively eliminated.

A further object is to provide a safety valve of the class described, comprising a body composed of two parts suitably secured together and having a plurality of valves concentrically disposed therein, whereby the various seats for said valves are concentric with the axis of the valve body, thereby to facilitate machining of the parts, and whereby the safety valve may be manufactured in quantity production at small cost.

A further object is to provide a safety valve of the class described, comprising a gravity operated breather exhaust valve and a gravity operated breather intake valve, and the breather exhaust valve being movable between two valve seats, one of which defines the breather exhaust opening which normally is closed by the valve, and the other valve seat being adapted to be engaged by the breather exhaust valve when moderate pressure is exerted thereagainst by the liquid in the tank, as when violently agitated therein, thereby to prevent splashing or leakage of fluid from the safety valve to the atmosphere and an emergency pressure release valve being embodied in the breather exhaust valve adapted normally to prevent liquid flow from the tank, but should an excessive pressure develop within the tank, said emergency valve is automatically opened to permit a portion of the liquid in the tank to quickly discharge therefrom, until the excessive pressure in the tank has been released, whereupon said valve will automatically close to interrupt further loss of liquid from the tank, said emergency valve being capable of operation, regardless of the position of the tank.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown, as various changes may be made within the scope of the claims which follow.

In the drawing:

Figure 1 is a vertical sectional view showing the invention embodied in a conventional manhole cover or closure such as used on oil tanks of the type commonly utilized for transporting gasoline and fuel oils;

Figure 2 is an enlarged sectional view on the line 2—2 of Figure 4, showing the valves in their normal closed positions;

Figure 3 is a detail sectional view showing the safety valve disassembled to show the various parts thereof;

Figure 4 is a sectional plan view substantially on the line 4—4 of Figure 2; and Figure 5 is a vertical sectional view of the safety valve in inverted position showing the positions of the various valves thereof, when the device is in such position.

In the selected embodiment of the invention herein shown, there is illustrated in Figure 1, a portion of a tank 2, comprising a filler opening or manhole 3, defined by an annular upright collar or flange 4. The upper edge of the collar 4 provides a seat for the usual manhole cover or closure, generally designated by the numeral 5. The closure 5 is shown pivotally connected to a strong arm 6 by a universal connection 7. One end of the strong arm 6 is hinged to the collar 4 by a pin 8 and a suitable locking device, generally designated by the numeral 9 is provided at the opposite end of the arm 6 for securing it in cover closing position, as shown in Figure 1. A suitable gasket or sealing element 10 is provided between the upper edge of the collar 4 and the closure 5 to provide a leakproof connection therebetween. A suitable spring 11 is interposed between the cover 5 and arm 6 to retain the cover in operative relation to the arm.

The novel safety valve herein disclosed is shown comprising a body composed of upper and lower members 12 and 13, respectively, secured together by suitable threads 14, as clearly illustrated in the drawing. The upper body member 12 is shown provided with a tubular exteriorally threaded extension 15, adapted to be received in a threaded opening 16 provided in a collar 17, shown secured to or integrally formed with the wall of the closure 5. The upper end of the tubular extension 15 is open to the atmosphere, and is provided with a suitable fire screen, generally designated by the numeral 18.

The upper body member 12 is shown provided with an annular interior wall 19, having a bottom face 20 whose inner portion provides a valve seat 21. The annular interior wall 19 is spaced inwardly from the outer wall 22 of the body member 12 to provide an annular space 23. This annular space is open to the interior of the tank at its upper side.

The lower body member 13 has a bottom wall 24 provided with an opening 25, which is surrounded by an annular valve seat 26. The valve seat 26 is spaced downwardly from the valve seat 21, and said valve seats are concentric with the axis of the valve body.

The lower body member 13 is shown provided at its upper portion with an annulus 27, which preferably is made integral with the body portion 13, although not necessarily. The annulus 27 is shown supported by a plurality of spaced ribs 28, which have their inner edges 29 machined to provide vertical guides for a breather exhaust valve, generally designated by the numeral 31. The annulus 27 of the lower body member 13 is relatively larger in diameter than the bottom face 20 of the annular wall 19, whereby when the annulus 27 is seated against the face 20 as shown in Figure 2, the face of the annulus 27 will be offset from the face 20 of the wall 19, whereby the inner exposed downwardly facing portion of the face 20 provides the valve seat 21, and the outer exposed upwardly facing portion of the annulus 27 provides a valve seat 30.

The breather exhaust valve 31, as shown in Figures 2, 3 and 4, is in the form of an annular ring-like member having its upper and lower faces disposed in parallel relation. The upper face of the exhaust valve 31 is adapted to engage the valve seat 21, and its bottom face is adapted to engage the valve seat 26, as will be clearly understood by reference to Figures 2 and 5.

The breather exhaust valve 31 is shown provided with a plurality of upright guides 33, which may be integrally formed therewith, as shown in the drawing, or otherwise secured thereto as may be desired. The upper portions of the vertical guides 33 are received in the bore or passage 34 provided in the extension 15, and the periphery of the disk 32 is guided in its vertical movements by the inner edges 29 of the ribs 28, whereby the breather exhaust valve 31 may be axially guided in its movements between the valve seats 21 and 26. The breather exhaust valve, as shown in Figure 2, is normally retained on the valve seat 26 by gravity, and is adapted to be unseated by pressure within the tank, which may be caused by air pressure within the tank, during filling of the tank, or by expansion of the liquid in the tank. When the valve 31 is thus opened by internal pressure in the tank, it ordinarily does not engage the upper seat 21, whereby such pressure is released to the atmosphere through the extension 15. Should the liquid be violently agitated within the tank, whereby it may violently surge back and forth therein, the liquid might engage the valve 31 with sufficient force to open it and move it into engagement with the upper valve seat 21, thereby preventing any of the liquid from discharging from the tank under such contingencies.

A breather intake valve 35, in the form of an annular ring, is shown seated upon the valve seat 30, formed by the outer portion of annulus 27, as hereinbefore stated. The upper edge 36 of the lower body member 13 constitutes a valve seat 36 which is disposed in a common plane with the valve seat 30, as will be clearly understood by reference to Figures 2 and 3, whereby the seats 30 and 36 cooperate to provide a common seat for the breather intake valve 35. The ring valve 35 is preferably retained on its seat by gravity, and should a portion of the liquid in the tank unseat the breather exhaust valve 31, and enter the interior of the lower body member 13, such liquid may unseat the intake breather valve 35, whereby it is returned to the interior of the tank.

An emergency pressure release valve is provided for automatically releasing excessive pressure from within the tank, and serves as a safeguard against tank explosions. The emergency pressure release valve comprises a disk-shaped head 38, having a stem 39 secured thereto which is vertically slidable in a suitable guide 41 provided in the guides 33 of the breather exhaust valve 31. A suitable spring 42 normally retains the emergency valve 38 on a seat 43, provided in the breather exhaust valve 31, as clearly illustrated in Figures 2 and 3.

The emergency pressure release valve 38 is operated only in the event of excessive internal pressure within the tank. The tension of the spring 42 is such that should the tank accidentally be overturned, the tension in the spring 42 is sufficient to overcome the weight of the liquid in the tank, and thereby retain the valve 38 in its closed position. It is to be understood that when the tank is overturned, the safety valve may, of course, be in the position shown in Figure 5, wherein the breather exhaust valve is moved into engagement with the valve seat 21, as clearly illustrated in Figure 5, thereby to interrupt fluid flow through the safety valve to the atmosphere. The valve 31 may be moved into engagement with the seat 21 by gravity, aided by the weight or pressure of the liquid thereagainst, when the tank is overturned.

Should the liquid within the tank expand sufficiently to develop an excessive pressure within the tank, the tension of the spring 42 may be overcome, whereby the emergency pressure release valve 38 is unseated, thereby to permit a portion of the liquid to discharge or drain from the tank to the atmosphere, through the passage 34. When the excessive pressure in the tank has been released, the spring 42 will automatically close the valve 38 to prevent further loss of liquid from the tank.

The novel safety valve herein disclosed has been found very practical and efficient in actual operation. It is very compact and small in size, and may readily be mounted in the usual closure 5 of the tank, as shown in Figure 1. In this figure it will be noted that the bottom wall of the lower portion 13 of the safety valve is disposed substantially in alignment with the upper wall of the tank 2, whereby the safety valve is substantially out of the path of the liquid, when the latter surges back and forth within the tank.

All of the machined surfaces of the safety valve are preferably concentric to the axis of the valve body, whereby a minimum of machine operations are required, which greatly reduces the manufacturing cost thereof. In the drawing I have also shown the upper body member 12 as having the annular interior wall 19 integrally cast therewith. It is to be understood that, if desired, the annular wall 19 of the upper member 12 of the valve body may be formed independently of the body member 12 and supported therein by being clamped between the annulus 27 of the lower body member 13 and the upper horizontal wall portion 47 of the member 12, as will readily be understood by reference to Figure 2. In like manner, the annulus 27, including the ribs 28, may also be formed independently of the lower body member 13, and be clamped therein by the body member 12, without departing from the scope of the invention.

The construction of the novel safety valve herein disclosed is such that all of the parts thereof may be assembled as a unitary structure independently of the closure 5 of the tank, and may be secured in position in the tank as a unitary structure, thereby greatly facilitating the construction of the device, as well as the mounting thereof in the tank cover.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a safety valve of the class described, a body composed of upper and lower portions, the upper portion having an exteriorly threaded extension adapted to be received in threaded engagement with a wall of a tank, a passage in said extension for establishing communication between the atmosphere and the interior of the valve body, the lower portion of the valve body being secured to the upper portion thereof and cooperating therewith to provide the completed valve body, the upper body portion having an interior wall spaced inwardly from the outer wall thereof and cooperating therewith to provide an annular valve chamber which is open to the exterior of the valve body, an annulus in the lower body portion having its upper face abuttingly engaging the bottom face of said interior wall and offset with respect thereto, thereby to provide an upwardly facing valve seat, located within said annular valve chamber, and a downwardly facing valve seat located within the central portion of the valve body, a ring-like valve member in said annular valve chamber engaging said upwardly facing valve seat to normally shut off communication between the interior of the tank and the interior of the valve body, said lower body portion having a central opening in its lower wall surrounded by an annular valve seat axially aligned with said downwardly facing valve seat and spaced therefrom, a breather exhaust valve normally engaging said annular valve seat and movable into engagement with said downwardly facing valve seat by pressure within the tank, thereby to prevent liquid flow from the tank, and an emergency pressure release valve carried by said breather exhaust valve adapted to be opened by excessive pressure within the tank, subsequent to the breather exhaust valve engaging said downwardly facing valve seat, thereby to automatically release excessive pressure from the tank which may be caused by expansion of the liquid therein.

2. In a safety valve of the class described, a body comprising an outer cylindrical wall, means on the upper portion of said body whereby it may be secured to a wall of a tank, a passage in the upper portion of said body for establishing communication between the atmosphere and the interior of the valve body, an annular interior wall in said body spaced inwardly from said outer cylindrical wall and cooperating therewith to provide an annular valve chamber which is open to the exterior of the valve body, said interior wall having an upwardly facing valve seat adjacent to its bottom and located at the bottom of the annular valve chamber, a second upwardly facing valve seat spaced outwardly from said first mentioned upwardly facing valve seat and cooperating therewith to provide a fluid passage therebetween for establishing communication between said annular valve chamber and the lower interior of the valve body, said upwardly facing valve seats being disposed in a common plane, a ringlike valve member in said annular valve chamber engaging said upwardly facing valve seats to normally shut off communication between the interior of the tank and the interior of the valve body through said annular valve chamber, a downwardly facing valve seat located within the central portion of the valve body, the bottom wall of said valve body having a central opening therein surrounded by an annular upwardly facing valve seat axially aligned with said downwardly facing valve seat and spaced therefrom, a breather exhaust valve normally engaging the upwardly facing valve seat on the bottom wall of the valve body and movable into engagement with said downwardly facing valve seat by pressure within the tank, thereby to prevent liquid flow from the tank, and an emergency pressure release valve carried by said breather exhaust valve adapted to be opened by excessive pressure within the tank, subsequent to the breather exhaust valve engaging said downwardly facing valve seat, thereby to release excessive pressure from the tank.

WALTER V. BROWN.